(12) United States Patent
Laaser et al.

(10) Patent No.: US 9,912,425 B2
(45) Date of Patent: Mar. 6, 2018

(54) RADIO FREQUENCY TRANSCEIVER WITH LOCAL OSCILLATOR CONTROL FOR MULTI-CARRIER APPLICATIONS

(71) Applicant: Intel Corporation, Santa Clara, CA (US)

(72) Inventors: Peter Laaser, Munich (DE); Christoph Schultz, Essen (DE); Christian Duerdodt, Bochum (DE)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 14/570,876

(22) Filed: Dec. 15, 2014

(65) Prior Publication Data
US 2016/0173215 A1 Jun. 16, 2016

(51) Int. Cl.
*H04L 12/28* (2006.01)
*H04J 1/12* (2006.01)
(Continued)

(52) U.S. Cl.
CPC ............ *H04J 1/12* (2013.01); *H04B 1/005* (2013.01); *H04B 1/0475* (2013.01); *H04B 1/10* (2013.01); *H04B 15/06* (2013.01)

(58) Field of Classification Search
CPC .................................. H04J 1/12; H04B 1/005
(Continued)

(56) References Cited

U.S. PATENT DOCUMENTS

| 5,929,896 A | * | 7/1999 | Goodman | ............ | H04M 11/00 348/14.12 |
| 7,437,134 B2 | | 10/2008 | Cowley et al. | | |

(Continued)

FOREIGN PATENT DOCUMENTS

| CN | 101931771 A | 12/2010 |
| CN | 102377493 A | 3/2012 |

(Continued)

OTHER PUBLICATIONS

"U.S. Appl. No. 10/824,873, Advisory Action dated Feb. 26, 2009", 3 pgs.
(Continued)

*Primary Examiner* — Dang Ton
(74) *Attorney, Agent, or Firm* — Schwegman, Lundberg & Woessner, P.A.

(57) ABSTRACT

Radio frequency (RF) communication circuitry comprises an RF transceiver and conflict detection circuitry. The RF transceiver includes a first communication path configured to down-convert received RF signals using a first local oscillator (LO) receive frequency; and a second communication path configured to down-convert received RF signals using a second LO receive frequency and to operate simultaneously with the first communication path. The conflict detection circuitry is configured to determine path crosstalk using the first and second LO receive frequencies and using a first LO transmit frequency used by the first RF transceiver or a second RF transceiver to up-convert electrical signals for RF transmission, and initiate a change of the first LO receive frequency by a first frequency shift value and a change of the second LO receive frequency by a second frequency shift value in response to the path crosstalk.

25 Claims, 12 Drawing Sheets

(51) Int. Cl.
*H04B 1/00* (2006.01)
*H04B 1/04* (2006.01)
*H04B 1/10* (2006.01)
*H04B 15/06* (2006.01)

(58) Field of Classification Search
USPC .......................................................... 370/201
See application file for complete search history.

(56) References Cited

U.S. PATENT DOCUMENTS

| | | | |
|---|---|---|---|
| 8,244,202 | B2 | 8/2012 | Kitayabu et al. |
| 2007/0230611 | A1* | 10/2007 | Sorrells .................. H03C 3/40 375/295 |
| 2008/0146165 | A1 | 6/2008 | Young et al. |
| 2011/0009161 | A1 | 1/2011 | Trikha et al. |
| 2011/0244812 | A1 | 10/2011 | Cowley et al. |
| 2012/0040628 | A1* | 2/2012 | Krug ...................... H04B 15/04 455/86 |
| 2014/0051366 | A1 | 2/2014 | Klomsdorf et al. |
| 2015/0009866 | A1 | 1/2015 | Sundström et al. |

FOREIGN PATENT DOCUMENTS

| | | |
|---|---|---|
| CN | 102611477 A | 7/2012 |
| CN | 105703794 A | 6/2016 |
| JP | 2003298447 A | 10/2003 |
| TW | 201630389 A | 8/2016 |

OTHER PUBLICATIONS

"U.S. Appl. No. 10/824,873, Final Office Action dated Nov. 17, 2008", 14 pgs.
"U.S. Appl. No. 10/824,874, Notice of Non-Compliant Amendment dated Apr. 28, 2009", 3 pgs.
"U.S. Appl. No. 10/825,021, Final Office Action dated Apr. 15, 2009", 10 pgs.
"U.S. Appl. No. 10/825,021, Non Final Office Action dated Oct. 31, 2008", 9 pgs.
"U.S. Appl. No. 10/825,345, Final Office Action dated Apr. 17, 2009", 13 pgs.
"U.S. Appl. No. 10/825,539, Advisory Action dated Mar. 11, 2009", 3 pgs.
"U.S. Appl. No. 10/825,539, Final Office Action dated Nov. 13, 2008", 16 pgs.
"U.S. Appl. No. 10/991,994, Non Final Office Action dated Mar. 26, 2009", 14 pgs.
"Canadian Application Serial No. 2,503,775, Office Action dated Jan. 8, 2009", 5 pgs.
"Canadian Application Serial No. 2,503,781, Office Action dated Jan. 8, 2009", 4 pgs.
"European Application Serial No. 07007897.7, Extended European Search Report dated Mar. 19, 2009", 12 pgs.
"European Application Serial No. 15194398.2, Extended European Search Report dated May 10, 2016", 8 pgs.
"European Application Serial No. 15194398.2, Response filed Dec. 19, 2016 to Extended European Search Report dated May 10, 2016", 21 pgs.
"Korean Application Serial No. 10-2006-7023880, Notice of Final Rejection dated Feb. 25, 2009", with English translation of claims, 5 pgs.
"Malaysian Application Serial No. PI 2005153, Office Action dated Mar. 6, 2009", in English, 3 pgs.
"Malaysian Application Serial No. PI20051531, Office Action dated Oct. 31, 2008", in English, 4 pgs.
"Singapore Application Serial No. 200607088-2, Office Action dated Apr. 13, 2009", in English, 7 pgs.
"Taiwanese Application Serial No. 104137177, Office Action dated Dec. 16, 2016", w/English Translation, 22 pgs.
"Taiwanese Application Serial No. 104137177, Further Response filed Mar. 23, 2017 to Office Action dated Dec. 16, 2016", w/ Claims in English, 19 pgs.
"Taiwanese Application Serial No. 104137177, Response filed Mar. 7, 2017 to Office Action dated Dec. 16, 2016", w/ claims in English, 24 pgs.
"Chinese Application Serial No. 201510765140.2, Office Action dated Aug. 8, 2017", w/ English translation, 22 pgs.

* cited by examiner

US 9,912,425 B2

RADIO FREQUENCY TRANSCEIVER WITH LOCAL OSCILLATOR CONTROL FOR MULTI-CARRIER APPLICATIONS

TECHNICAL FIELD

Embodiments pertain to transmitting voice data using radio access networks. Some embodiments relate to reducing crosstalk in mobile telephone communication equipment.

BACKGROUND

Radio access networks are used for delivering voice communications to user equipment such as a cellular telephone or a smart phone. A desirable feature of devices included in a radio network is carrier aggregation, or the simultaneous transmission or reception of at least two distinct frequency channels. A challenge to implementing carrier aggregation is the problem of crosstalk between the frequency channels during the simultaneous operation of the channels. Thus, there are general needs for devices, systems and methods that provide robust communication channel with minimum crosstalk in end-to-end voice communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
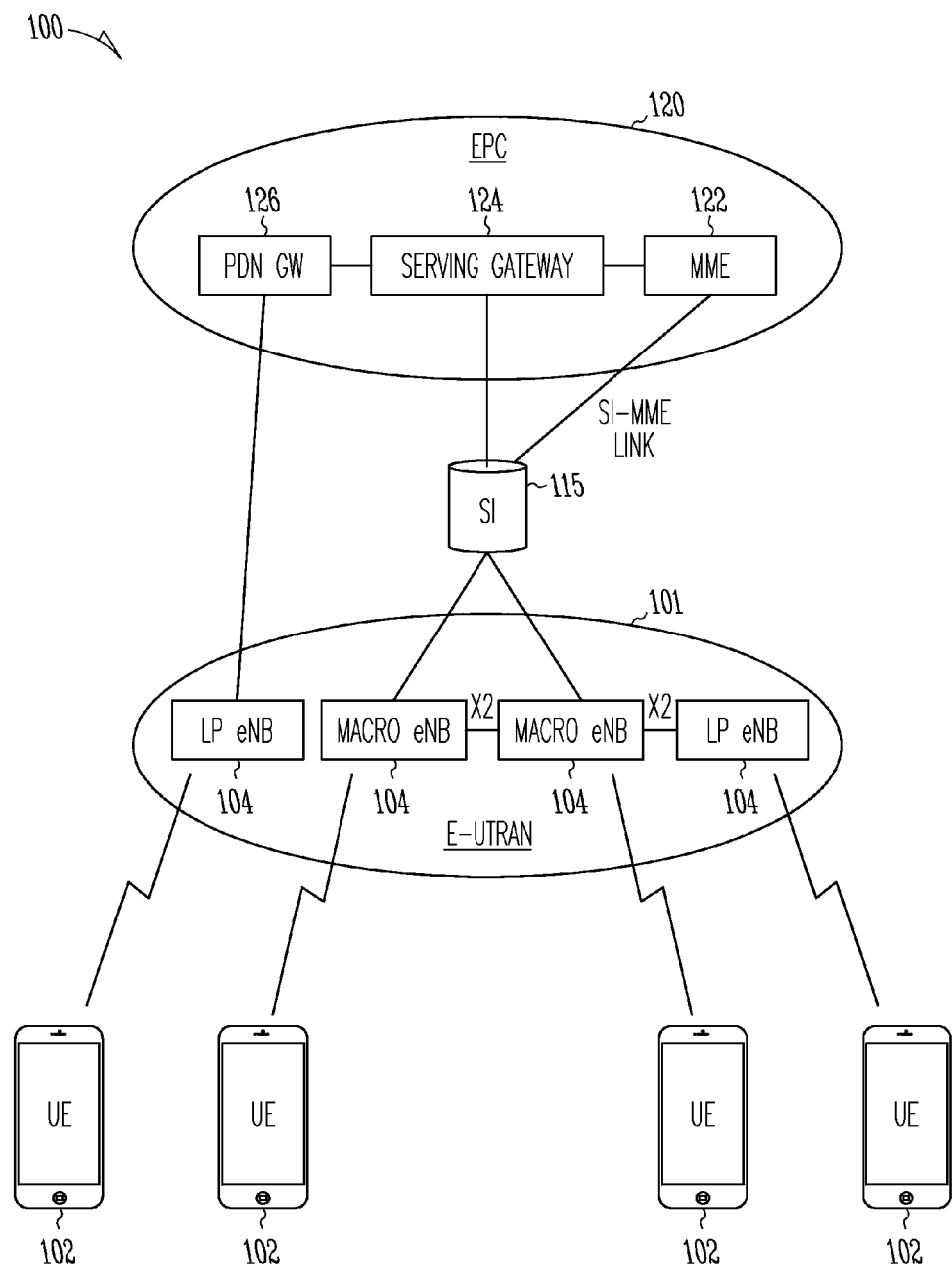
FIG. 1 illustrates an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity, only a portion of the core network 120, as well as the RAN 100, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

As explained previously, it is desirable to implement carrier aggregation in a radio access network, where RF communication devices such as UEs and network node devices communicate using multiple channels simultaneously. However, channel crosstalk in RF communication devices makes carrier aggregation difficult to implement.

Figure 2:
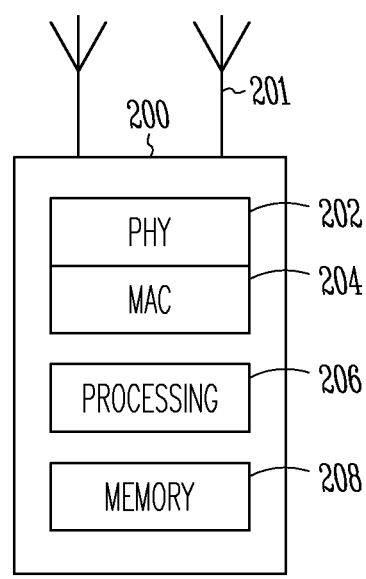
FIG. 2 shows a functional block diagram of an example of user equipment in accordance with some embodiments.

FIG. 2 illustrates a functional block diagram of a UE in accordance with some embodiments. The UE 200 may be suitable for use as any one or more of the UEs 102 illustrated in FIG. 1. The UE 200 may include physical layer (PHY) circuitry 202 for transmitting and receiving radio frequency electrical signals to and from one or more nodes of a radio access network such as eNBs 104 (FIG. 1) using one or more antennas 201. The PHY circuitry 202 may include circuitry for modulation/demodulation, upconversion/downconversion, filtering, amplification, etc. UE 200 may also include medium access control layer (MAC) circuitry 204 for controlling access to the wireless medium and to configure frames or packets for communicating over the wireless medium. UE 200 may also include processing circuitry 206 and memory 208 arranged to configure the various elements of the UE to perform the operations described herein. The memory 208 may be used to store information for configuring the processing circuitry 206 to perform the operations.

In some embodiments, the UE 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more of a keyboard, a display, a non-volatile memory port, multiple antennas, a graphics processor, an application processor, speakers, and other mobile device elements. The display may be an LCD screen including a touch screen.

The one or more antennas 201 utilized by the UE 200 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 200 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network or a high speed downlink/uplink access (HSDPA/HSUPA) communication network or a universal mobile telecommunications system (UMTS) network or a global system for mobile communications (GSM) network, although the scope of the invention is not limited in this respect.

Figure 3:
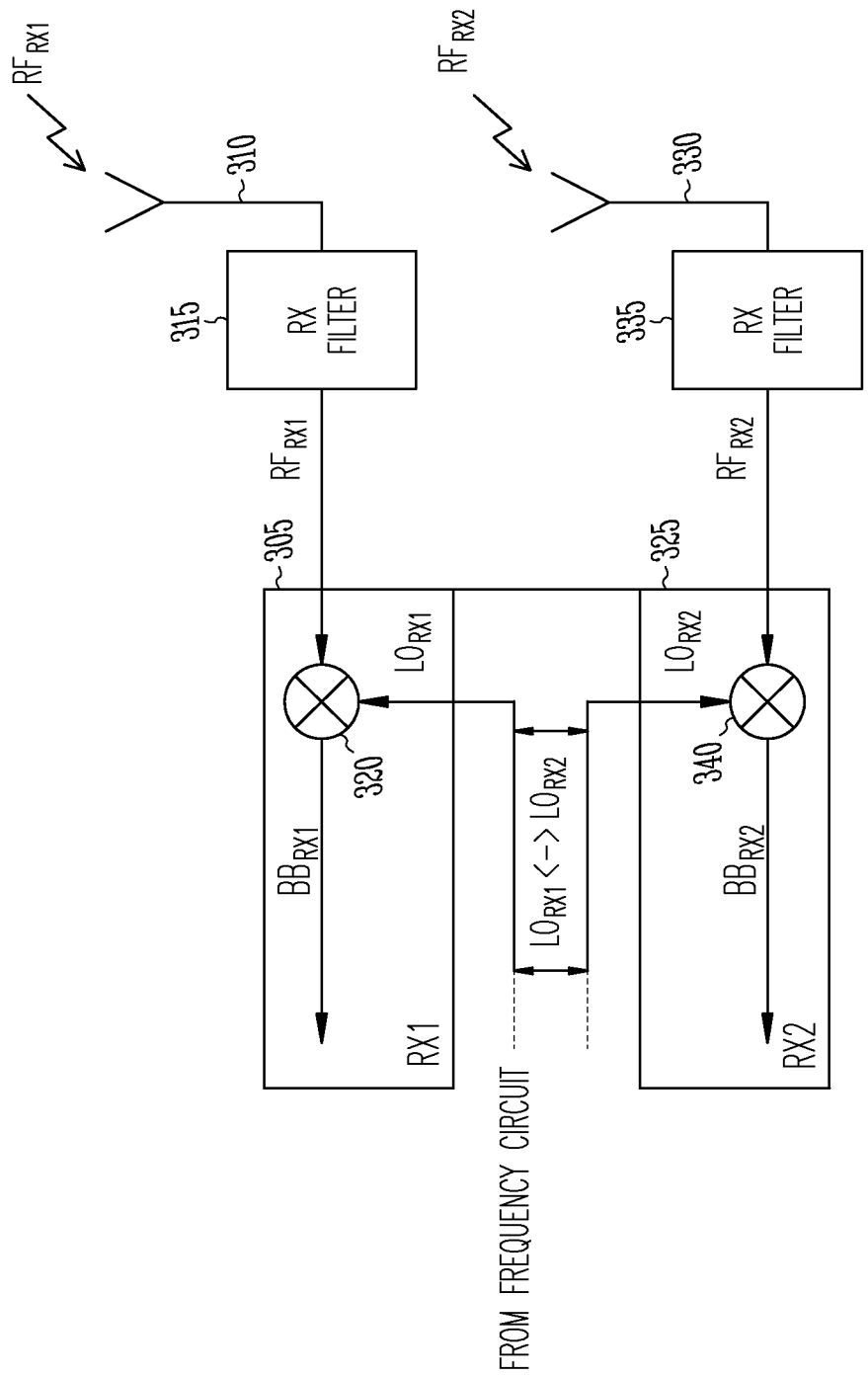
FIG. 3 is a circuit block diagram showing portions of an example of a frequency division duplexing dual carrier configuration for RF communication circuitry in accordance with some embodiments.

FIG. 3 is a circuit block diagram showing portions of an example of a frequency division duplexing (FDD) dual carrier configuration of an RF communication device (e.g., a network node device, or UE) in accordance with some embodiments. The configuration includes a first communication path 305 that includes at least one antenna 310, filter circuit 315, and mixer circuit 320. The first communication path 305 down-converts a desired received RF signal by mixing the received signal with a first local oscillator (LO) signal $LO_{RX1}$ of a first receive frequency $f_{LORX1}$ using the mixer circuit 320. The configuration also includes a second communication path 325 that includes at least one antenna 330, filter circuit 335, and mixer circuit 340. The second communication path 325 down-converts a desired received RF signal by mixing the received signal with a second LO signal ($LO_{RX2}$) of a second receive frequency $f_{LORX2}$ using the mixer circuit 340. The second communication path 325 operates simultaneously with the first communication path. The first and second communication paths can be included in the PHY circuitry of the RF communication device. Due to electrical and electro-magnetic coupling between the LO signals $LO_{RX1}$ and $LO_{RX2}$, unwanted side tones pop up in the side tones of the LO signals, especially when the communications paths share the same power supply or are fabricated on the same integrated circuit (IC) die.

Figure 4:
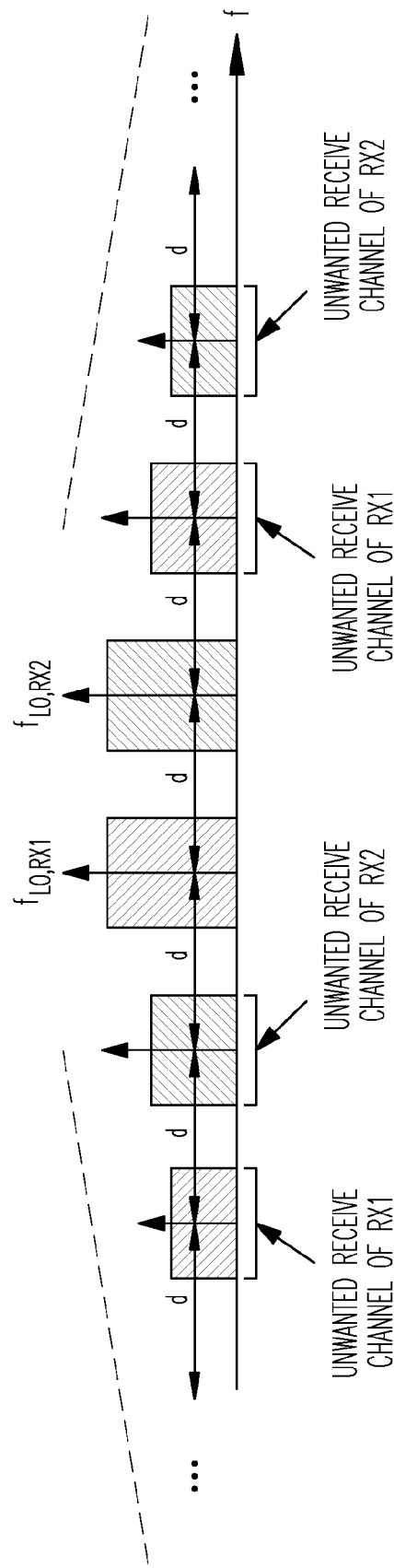
FIG. 4 shows a spectrum plot of the example of a frequency division duplexing dual carrier configuration in accordance with some embodiments.

FIG. 4 shows a spectrum plot of the example of the FDD dual carrier configuration of FIG. 3. The example spectrum plot shows the wanted local oscillator frequencies $f_{LORX1}$ and $f_{LORX2}$ down-mixing the wanted receive channels RX1 and RX2, and shows unwanted side-tones of the LO signals $LO_{RX1}$ and $LO_{RX2}$ down-mixing unwanted receive channels.

A receive channel includes a center frequency and a frequency band centered on the center frequency. The side-tone frequencies corresponding to the center frequencies of the unwanted receive channels pop up at multiples of a constant frequency offset d that corresponds to the absolute difference between $f_{LORX1}$ and $f_{LORX2}$.

Figure 5:
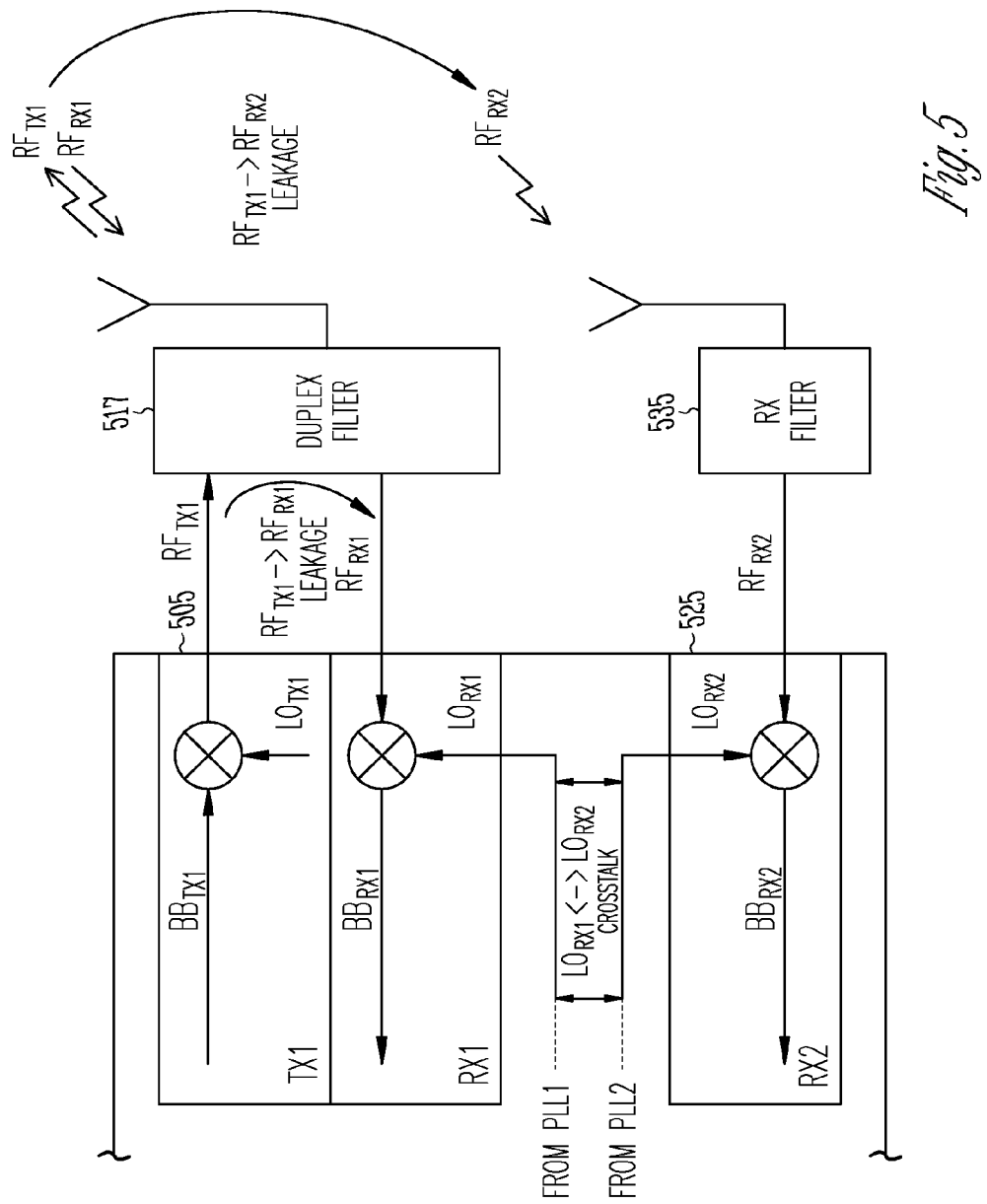
FIG. 5 is a circuit block diagram showing portions of another example of a dual carrier configuration in accordance with some embodiments.

FIG. 5 is a circuit block diagram showing portions of another example of a dual carrier configuration of an RF communication device. The example includes a first communication path 505 and includes a second communication path 525. The first communication path 505 and the second communication path 525 each include each one receive channel (RX1) and (RX2), respectively. The first communication path 505 also includes a transmit channel (TX1). The first communication path 505 up-converts electrical signals for RF transmission using a LO transmit signal $LO_{TX1}$ having a transmit frequency.

When both the first communication path 505 and the second communication path 525 are implemented on the same IC die, path crosstalk can appear between LO signals $LO_{RX1}$ and $LO_{RX2}$. Due to limited isolation available in the duplex filter 517, the limited isolation between the antennas connected to the communication paths, and the limited attenuation of the receive filter 535, an attenuated version of the RF transmit signal (up-converted at $LO_{TX1}$) may appear at the receive input of the receive channel RX1 of the same communication path or the input of the other receive channel RX2 and fall into an unwanted receive channel. A crosstalk issue may appear when the frequency of an unwanted side-tone of $LO_{RX1}$ or $LO_{RX2}$ is located within or close to the frequency of the RF transmit frequency or a harmonic of the RF transmit frequency. The signal transmit by TX1 may be mixed down by a side tone of one or both of $LO_{RX1}$ and $LO_{RX2}$ and appear as an interferer to one or both of receive channels RX1 and RX2.

Figure 6:
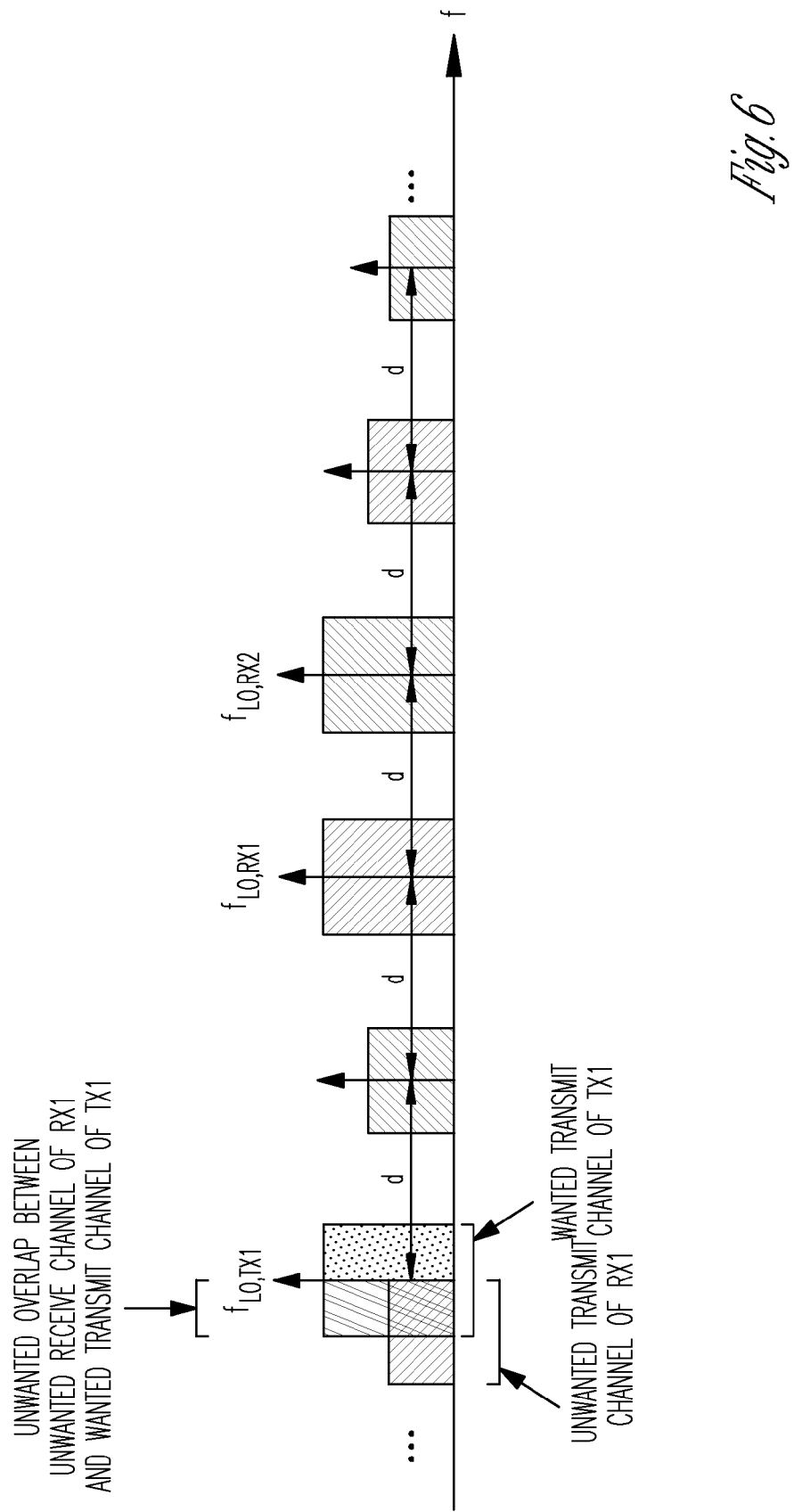
FIG. 6 shows a graphical representation of an overlap between the frequency of the desired transmit channel and an unwanted receive channel in accordance with some embodiments.

FIG. 6 shows a representation of an overlap between the desired transmit channel TX having center transmit frequency $f_{LOTX1}$ and an unwanted receive channel. Also shown is the wanted receive channel RX1 at center frequency $f_{LORX1}$. An overlap could also happen between the transmit channel and an unwanted receive channel of the second communication path. The unwanted receive channel and therefore the overlapping part of the transmit channel is down-mixed by an unwanted side-tone of the wanted LO signal $LO_{RX1}$. The reception of a receive signal may not be possible because the spectrum of the wanted receive signal and unwanted TX signal overlap after down-mixing, and the amplitude of the wanted receive signal spectrum is much lower than the amplitude of the unwanted TX signal spectrum.

Figure 7:
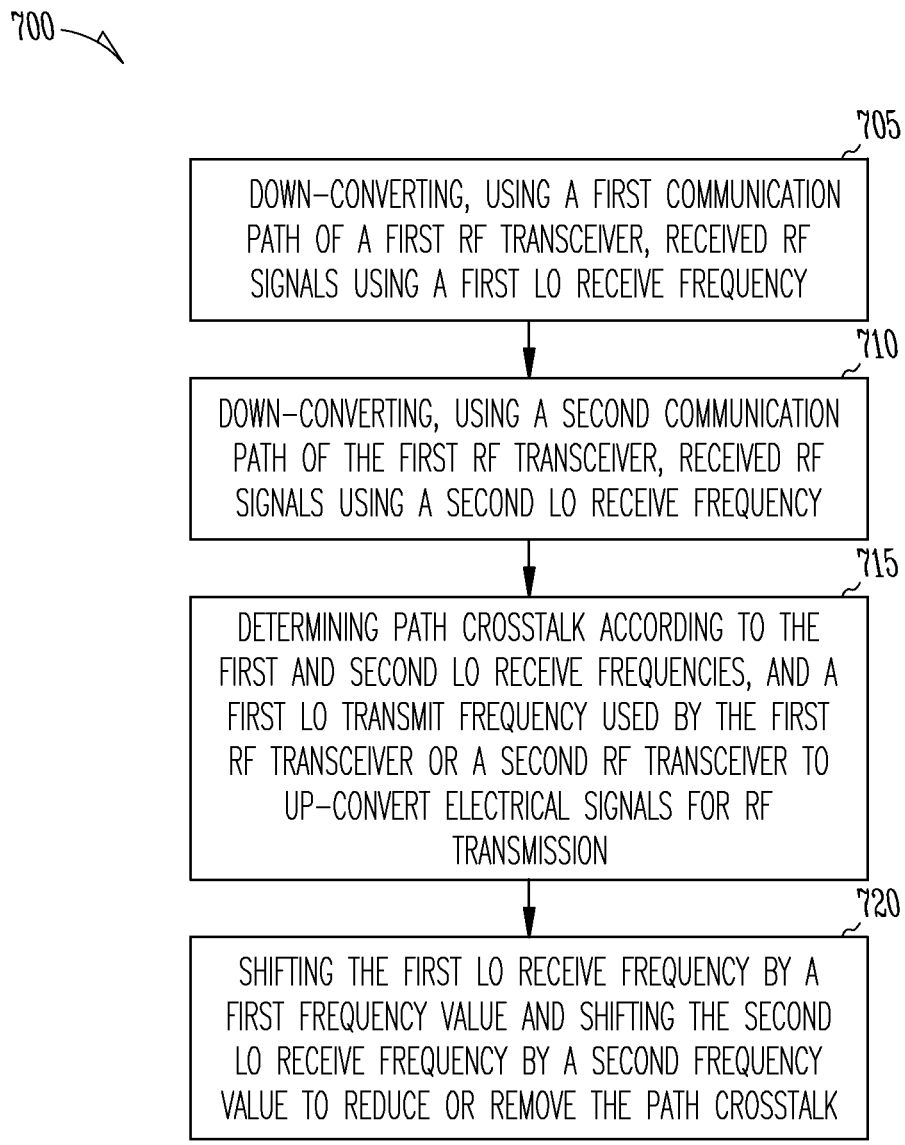
FIG. 7 is a flow diagram of a method of operating radio frequency (RF) communication circuitry in an end-to-end communication network to minimize crosstalk in accordance with some embodiments.

FIG. 7 is a flow diagram of a method of operating RF communication circuitry in an end-to-end communication network to minimize crosstalk. At 705, a first communication path of a first RF transceiver is used to down-convert received RF signals using a first LO signal $LO_{RX1}$ of a first receive frequency. At 710, a second communication path of the RF transceiver device is used to down-convert received RF signals using a second LO signal $LO_{RX2}$ of a second receive frequency. The second communication path operates simultaneously with the first communication path and hence the communication paths implement carrier aggregation.

At 715, path crosstalk is determined according to $LO_{RX1}$, $LO_{RX2}$, and a LO signal $LO_{TX}$ having transmit frequency $f_{LOTX}$. Signal $LO_{TX}$ may be used by the first RF transceiver or a by second separate RF transceiver to up-convert electrical signals for RF transmission. At 720, the frequency $f_{LORX1}$ of $LO_{RX1}$ is shifted by a first frequency value and the frequency $f_{LORX2}$ of $LO_{RX2}$ is shifted by a second frequency value to reduce or remove the path crosstalk.

Figure 8:
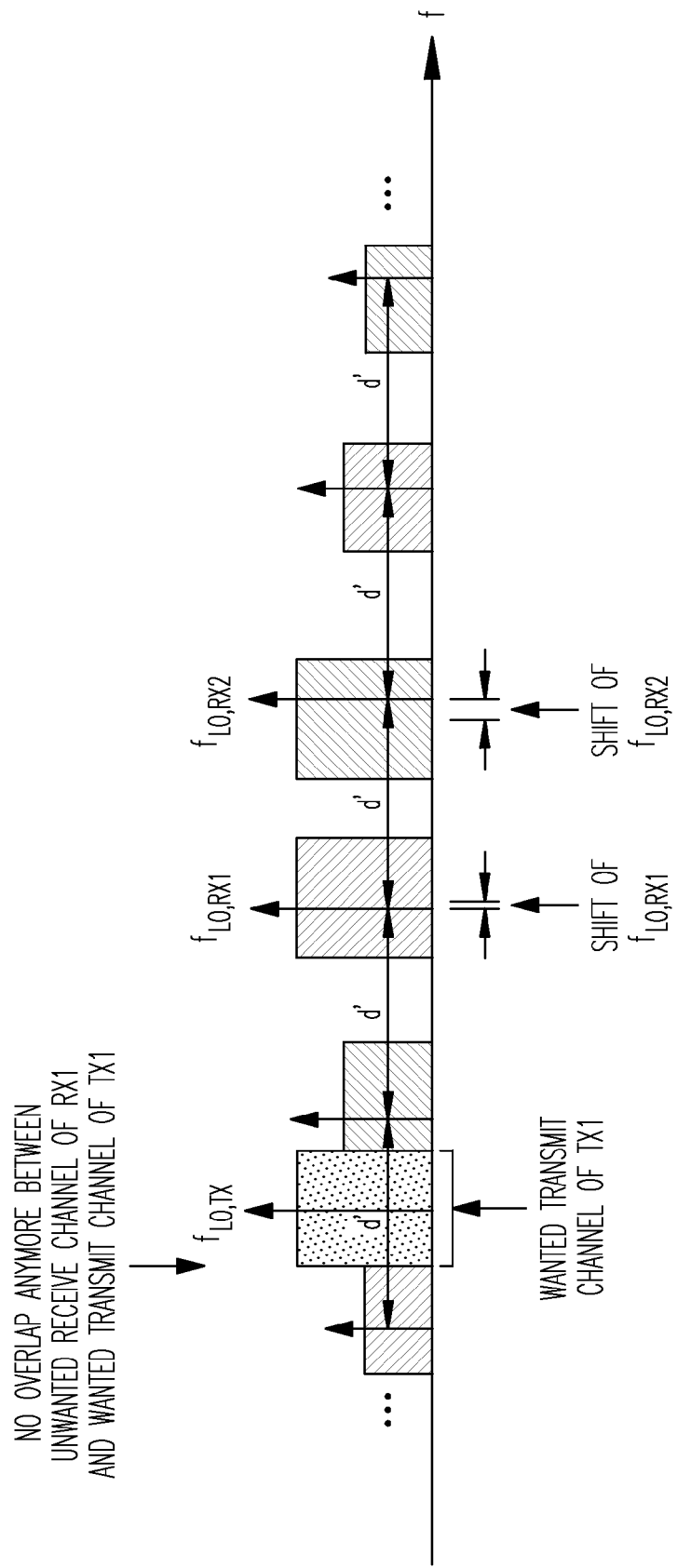
FIG. 8 shows an example of shifting the local oscillator receive frequencies in accordance with some embodiments.

FIG. 8 shows an example of shifting the LO receive frequencies. The frequencies $f_{LORX1}$ and $f_{LORX2}$ are shifted in a way that when unwanted crosstalk occurs, the unwanted side tones of $LO_{RX1}$ and $LO_{RX2}$ and unwanted receive channels appear outside the TX channel. Thus, a two dimensional solution to the problem of crosstalk in carrier aggregation is provided. After the shift, the LO frequencies are no longer located in the center of the receive channels.

Figure 9:
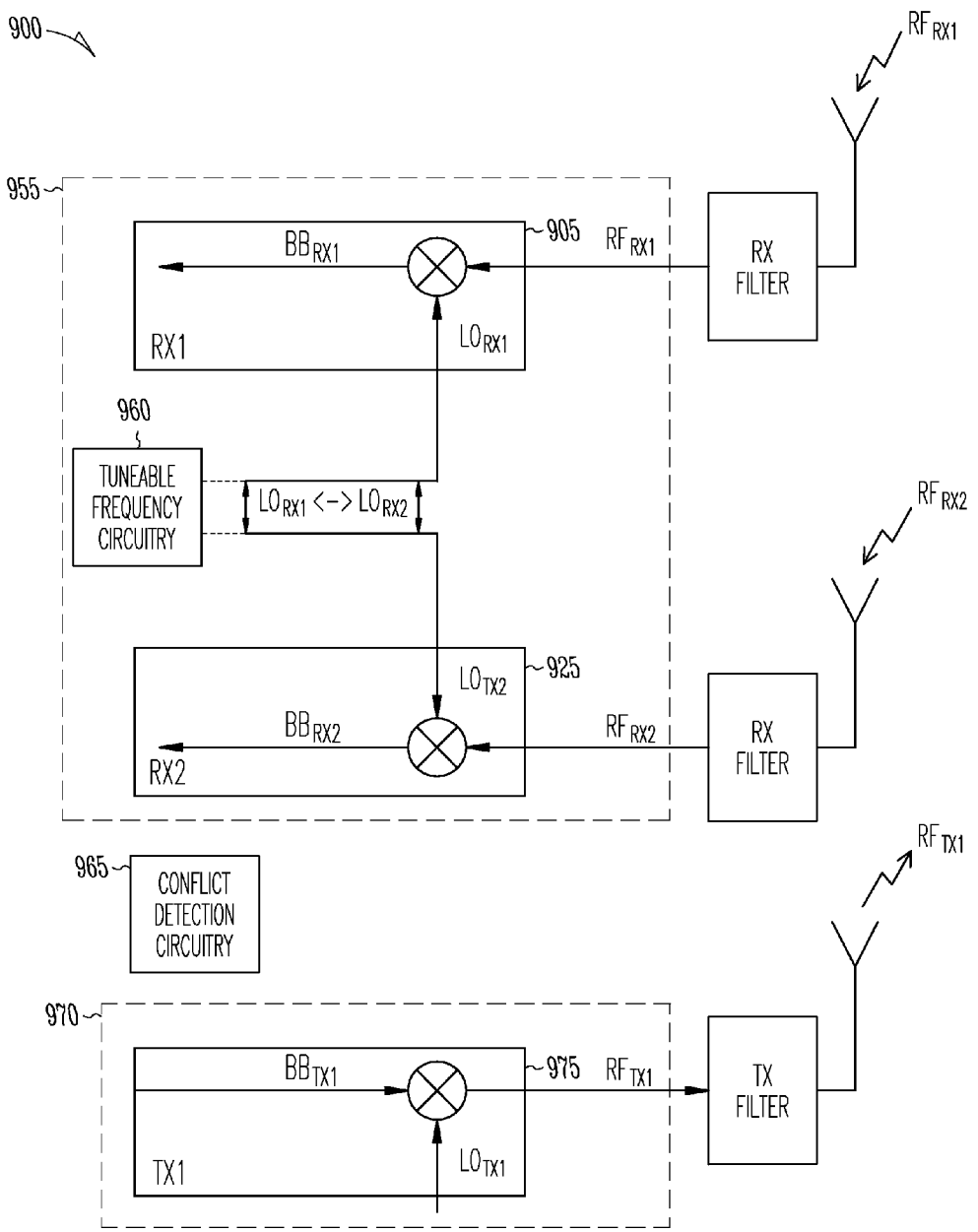
FIG. 9 shows a circuit block diagram of an example of RF communication circuitry in accordance with some embodiments.

FIG. 9 shows a circuit block diagram of an example of RF communication circuitry 900. The circuitry includes an RF transceiver 955 that includes a first communication path 905 and a second communication path 925. As in the example of FIG. 3, the first communication path 905 down-converts received RF signals using a first LO receive signal $LO_{RX1}$ having a first receive frequency $f_{LORX1}$. The second communication path operates simultaneously with the first communication path and down-converts received RF signals using a second LO receive signal $LO_{RX2}$ having a second receive frequency $f_{LORX2}$. In certain embodiments, the first communication path 905 and the second communication path 925 operate simultaneously in the same frequency band designated for the network, but use different RF receive channels. The RF communication circuitry 900 includes tuneable frequency synthesizer circuitry 960 that provides tuneable local oscillator frequencies. Some embodiments of the tuneable frequency synthesizer circuitry 960 include a direct-digital frequency synthesizer or a tuneable phase lock loop (PLL) circuit.

The RF communication circuitry 900 also includes conflict detection circuitry 965. The conflict detection circuitry 965 determines path crosstalk using the frequencies $f_{LORX1}$ and $f_{LORX2}$, and using a LO transmit signal $LO_{TX}$ having transmit frequency $f_{LOTX}$. Signal $LO_{TX}$ may be used by the first RF transceiver or by a second RF transceiver to up-convert electrical signals for RF transmission.

The conflict detection circuitry 965 can determine path crosstalk by calculation. In some embodiments, the conflict detection circuitry 965 determines path crosstalk by calculating one or both of whether an RF signal, transmit by the first RF transceiver device or the second RF transceiver device, is down-mixed by a side tone of $LO_{RX1}$ to interfere in the first communication path 905, and whether the RF signal transmitted is down-mixed by a side tone of $LO_{RX2}$ to interfere in the second communication path 925. In response to determining path crosstalk, the conflict detection circuitry 965 initiates a change of $f_{LORX1}$ by a first frequency shift value and a change of $f_{LORX2}$ by a second frequency shift value, such as by adjusting the tuneable frequency synthesizer circuitry 960 for example.

An RF control unit device (e.g., a network base station or an eNB) may specify the LO frequencies by communicating the receive LO frequencies to an RF communication device (e.g., UE) that includes the first RF transceiver. The RF control unit device may communicate the transmit LO frequency to a second RF communication device that includes a second RF transceiver 970. The second RF transceiver 970 can include a third communication path 975 that up-converts the electrical signals for RF transmission using $LO_{TX}$.

The conflict detection circuitry 965 can be included in processing circuitry of the RF control unit device. The processing circuitry may initiate a determination of path crosstalk when the first LO receive frequency, the second LO receive frequency, and the first LO transmit frequency are specified (e.g., communicated or programmed) in the RF control unit device. The conflict detection circuitry 965 can determine interference of the up-converted transmit signal (or a frequency harmonic of the up-converted transmit signal) with a $k^{th}$ side-tone of the $LO_{RX1}$ or with an $m^{th}$ side-tone of $LO_{RX2}$, where k and m are positive integers.

In certain embodiments, the conflict detection circuitry 965 determines that an RF transmit signal $RF_{TX1}$ is down-mixed into the first communication path by a side tone of $LO_{RX1}$, when the following in-equation is satisfied:

$$|f_{RX1}+\Delta_1-k\cdot|(f_{RX2}+\Delta_2)-(f_{RX1}+\Delta_1)|\pm(\Delta_1-f_{TX1})| \leq (0.5\cdot BW_{TX1}+0.5\cdot BW_{RX1}). \quad (1)$$

Similarly, the conflict detection circuitry 965 may determine that an RF transmit signal $RF_{TX1}$ is down-mixed into the second communication path by a side tone of $LO_{RX2}$, when the following in-equation is satisfied:

$$|f_{RX2}+\Delta_2-m\cdot|(f_{RX2}+\Delta_2)-(f_{RX1}+\Delta_1)|\pm(\Delta_2-f_{TX1})| \leq (0.5\cdot BW_{TX1}+0.5\cdot BW_{RX2}). \quad (2)$$

For in-equations (1) and (2), the variable $f_{TX1}$ is the carrier frequency of the up-converted transmit signal TX1, and $BW_{TX1}$ is the bandwidth of TX1. The variable $f_{RX1}$ is the carrier frequency of the down-converted receive signal RX1, and $BW_{RX1}$ is the bandwidth of RX1. The variable $f_{RX2}$ is the carrier frequency of the down-converted receive signal RX2, and $BW_{RX2}$ is the bandwidth of RX2. The variable $\Delta_1$ is the delta between the first LO receive frequency ($f_{LO1}$) and the carrier frequency of the down-converted receive signal RX1 or $\Delta_1 = f_{LO1} - f_{RX1}$, and variable $\Delta_2$ is the delta between the second LO receive frequency ($f_{LO2}$) and the carrier frequency of the down-converted receive signal RX2 or $\Delta_2 = f_{LO2} - f_{RX2}$. The variables k and m are integers and denote the order of the side tone (e.g., k=2, 4, ...).

A crosstalk issue can be detected when the in-equations are satisfied for any $k_{CRIT}$ or $m_{CRIT}$. When a crosstalk issue is detected, the conflict detection circuitry 965 initiates a shift of the $LO_{RX1}$ and $LO_{RX2}$ frequencies that results in a first frequency separation margin between the $LO_{TX1}$ frequency $f_{LOTX1}$ and the frequency of the $k_{CRIT}^{th}$ side tone of $LO_{RX1}$ and a second different frequency separation margin between $f_{LOTX1}$ and the $m_{CRIT}^{th}$ side tone of $LO_{RX2}$.

The desired separation can be determined using the center frequencies of RX1 receive channel, RX2 receive channel, and TX transmit channel, and the bandwidths of the TX transmit channel, the RX1 receive channel, and RX2 receive channel. In certain embodiments, the conflict detection circuitry 965 calculates shift values for parameters $\Delta_1$ and $\Delta_2$ by:

$$(\Delta_2 - \Delta_1) = \left( \frac{DUX + (0.5\cdot BWTX1 + 0.5\cdot BWRX1)}{kcrit} - \Delta_{12} \right), \quad (3)$$

where $(\Delta_2 \geq 0)$ and $(\Delta_1 \leq 0)$.

Figure 10:
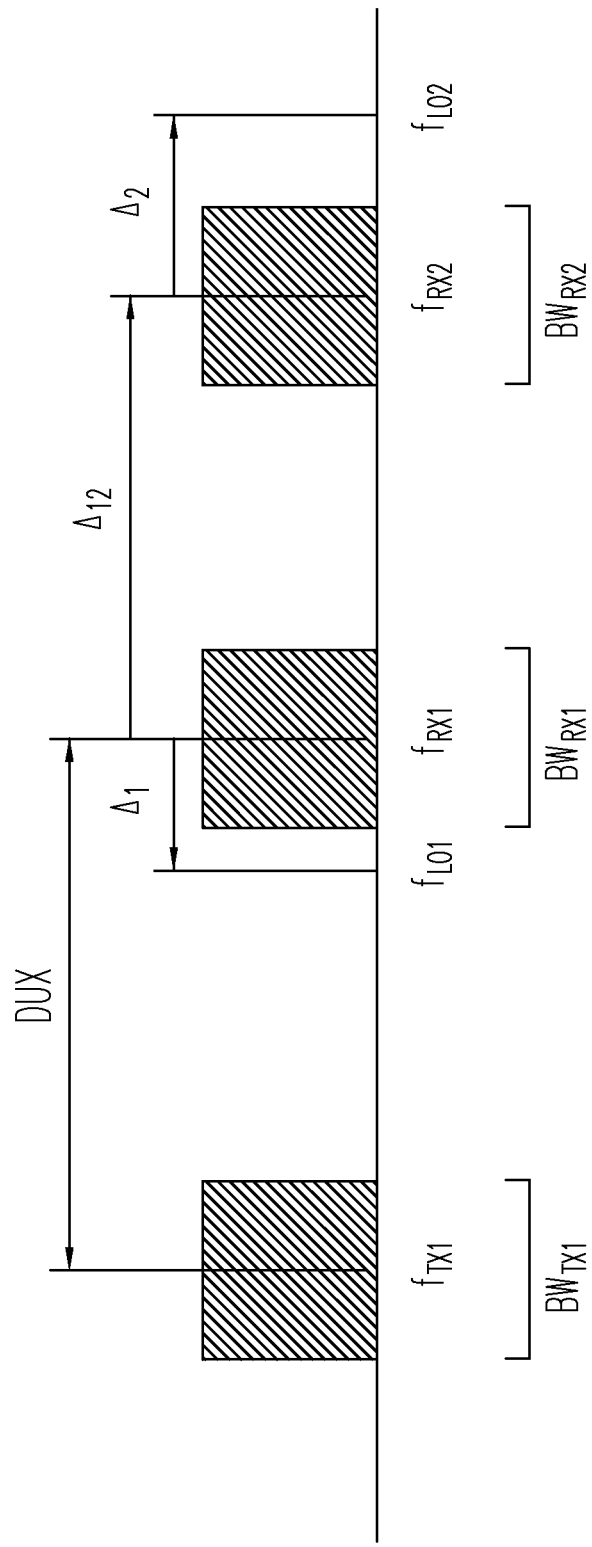
FIG. 10 illustrates the relationship of the variables of example equations to determine local oscillator separation in accordance with some embodiments.

In the above equation, variable DUX is the separation between the carrier frequency of the up-converted transmit signal in TX1 and the carrier frequency of the down-converted receive signal in RX1 (or in RX2), or $DUX = f_{RX1} - f_{TX1}$, and $\Delta_{12} = f_{RX1} - f_{RX2}$. FIG. 10 illustrates the relationship of the variables of the equations. The frequency separation for LO signals $LO_{RX1}$ and $LO_{RX2}$ to minimize crosstalk can be calculated during operation or can be pre-calculated and stored in a lookup table in memory.

Other arrangements of the RF transceivers and conflict detection circuitry are possible. For instance, in the example of FIG. 9 the conflict detection circuitry 965 can be included in processing circuitry of one or both of the first RF communication device and the second RF communication device (e.g., UEs) instead of in the RF control unit device (e.g., an eNB).

Figure 11:
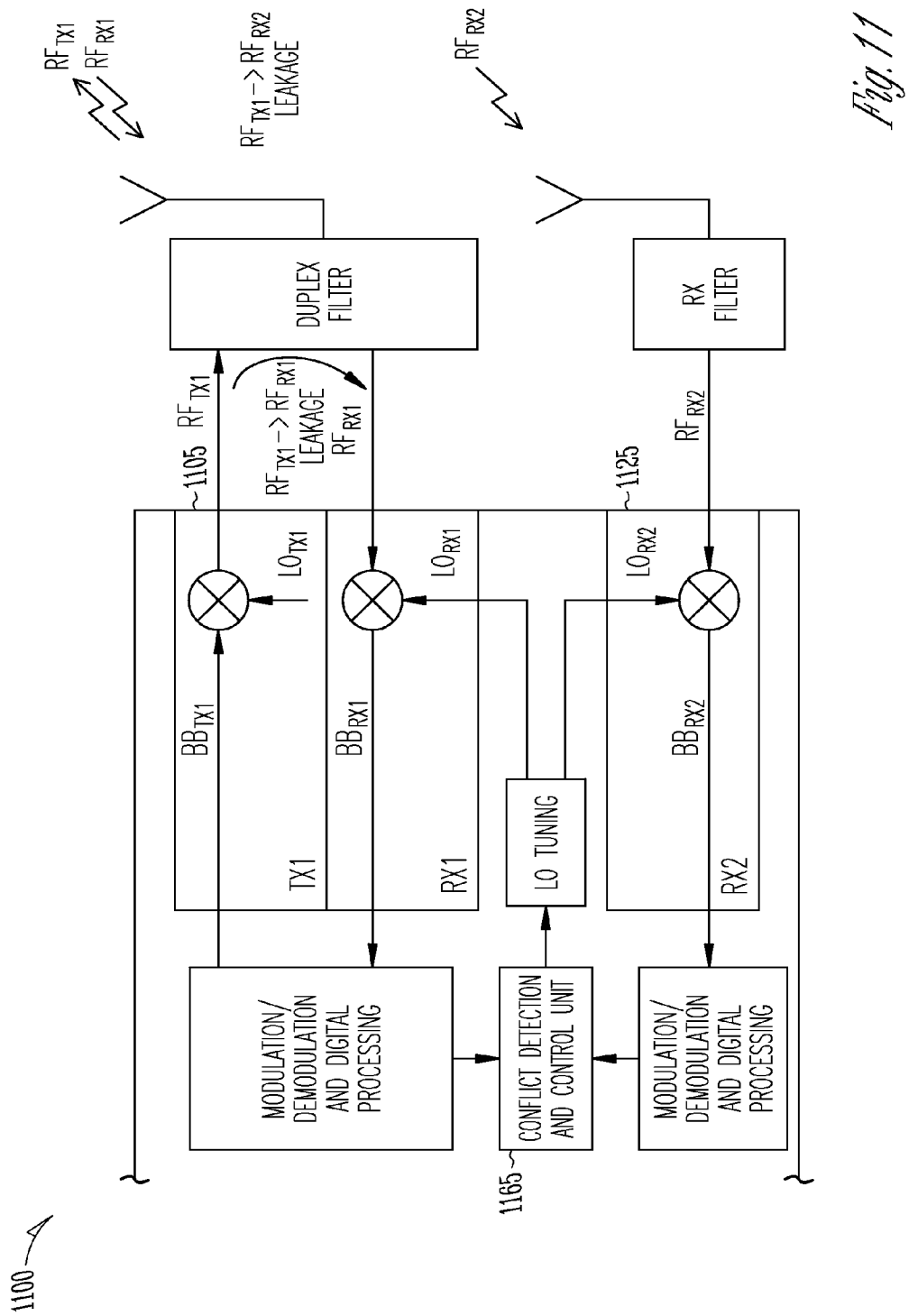
FIG. 11 shows a circuit block diagram of another example of RF communication circuitry in accordance with some embodiments.

FIG. 11 shows a circuit block diagram of another example of RF communication circuitry 1100. The RF communication circuitry 1100 is included in an RF transceiver and has a first communication path 1105 and a second communication path 1125. The first communication path 1105 up-converts electrical signals for RF transmission using an LO transmit signal $LO_{TX1}$ having a first transmit frequency $f_{LOTX1}$ and down-converts the received RF signals using the first LO receive signal $LO_{RX1}$ having first receive frequency $f_{LORX1}$. The second communication path 1025 down-converts the received RF signals using the second LO receive signal $LO_{RX2}$ having second receive frequency $f_{LORX2}$. The conflict detection circuitry 1165 can be included in processing circuitry of the RF communication circuitry 1100. The processing circuitry may initiate a determination of path crosstalk when values of LO receive frequencies and the LO transmit frequency are specified (e.g., received from an RF control unit) in the RF communication device or when interference is detected by the device on one or both of the first communication path 1105 and the second communication path 1125.

Further arrangements are possible. For instance, the second communication path 1125 may both down-convert received RF signals using LO signal $LO_{RX2}$ and up-convert electrical signals for RF transmission using a second LO transmit signal $LO_{TX2}$ having second transmit frequency $f_{LOTX2}$. The conflict detection circuitry 1165 may determine path crosstalk using frequencies $f_{LORX1}$, $f_{LORX2}$, and $f_{LOTX2}$.

Figure 12:
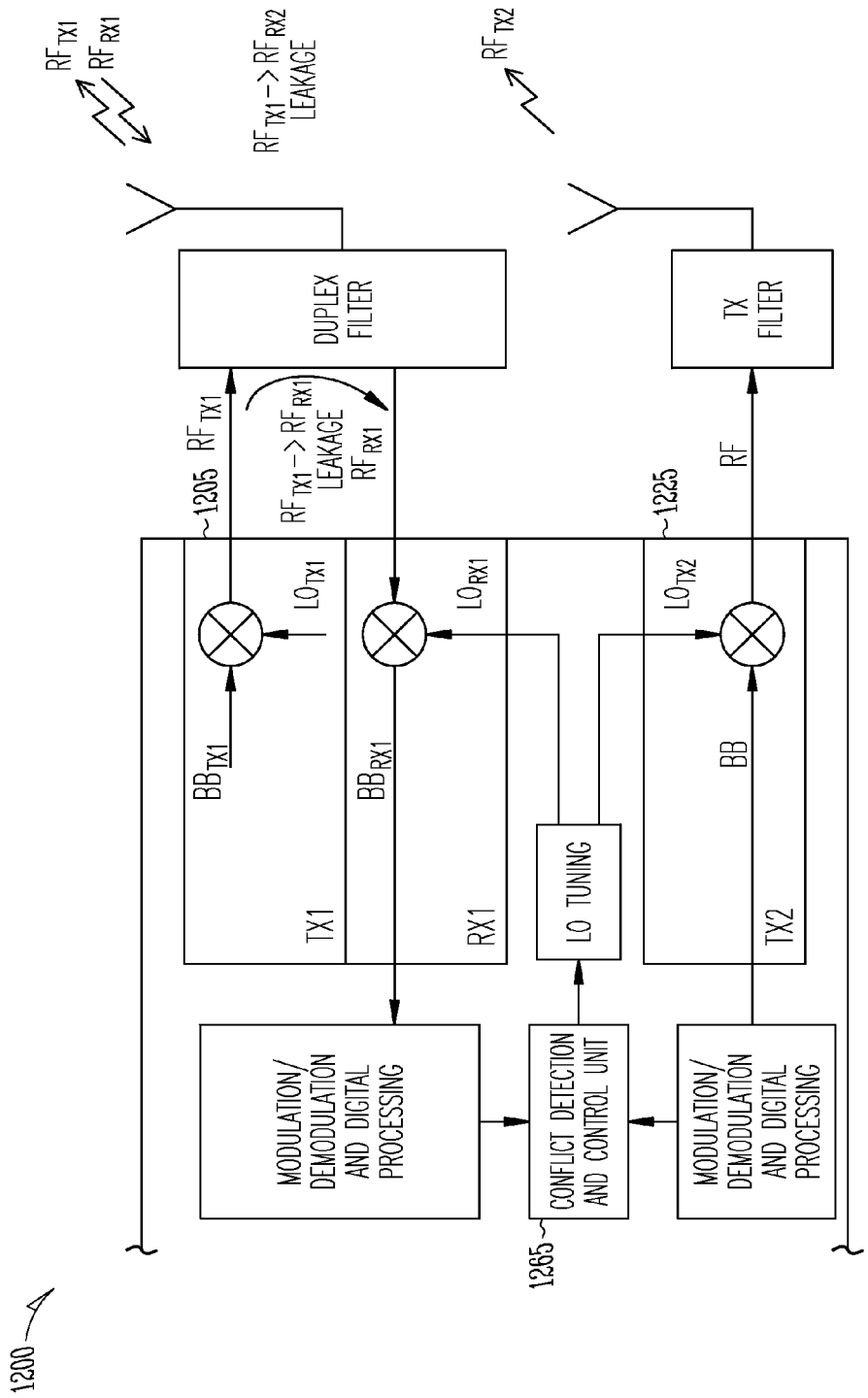
FIG. 12 shows a circuit block diagram of still another example of RF communication circuitry in accordance with some embodiments.

FIG. 12 shows a circuit block diagram of another example of an RF communication device 1200. The device includes PHY circuitry having a first communication path 1205 configured to up-convert electrical signals for RF transmission using a first LO transmit signal $LO_{TX1}$ having frequency $f_{LOTX1}$ and down-convert received RF signals using a LO receive signal $LO_{RX1}$ having frequency $f_{LORX1}$. The device also has a second communication path 1225 that up-converts RF signals for transmission using a second LO transmit signal $LO_{TX2}$ having frequency $f_{LOTX2}$ and operates simultaneously with the first communication path 1205. The device also includes a conflict detection circuitry 1265 as part of its processing circuitry.

The conflict detection circuitry 1265 determines path crosstalk using frequencies $f_{LOTX1}$, $f_{LORX1}$, and $f_{LOTX2}$. If there is a path crosstalk issue, the conflict detection circuitry 1265 initiates a change of the $f_{LORX1}$ by a first frequency shift value and a change of one or both of the $f_{LOTX1}$ and $f_{LOTX2}$ by a second frequency shift value.

In some embodiments, the conflict detection circuitry 1265 determines interference of a transmit signal up-converted using signals $LO_{TX1}$ or $LO_{TX2}$ with a $k^{th}$ side-tone of the signal $LO_{RX1}$. If there is a path crosstalk issue, the conflict detection circuitry 1265 initiates a shift of $f_{LORX1}$ and a shift in $f_{LOTX1}$ that results in a first frequency separation margin between $f_{LOTX1}$ and the frequency of the $k^{th}$ side tone of signal $LO_{RX1}$ and a second different frequency separation margin between $f_{LOTX2}$ and the $k^{th}$ side tone of signal $LO_{RX1}$.

The several examples described provide solutions to minimize crosstalk between communication channels when implementing channel aggregation in a communication network.

ADDITIONAL NOTES AND EXAMPLES

Example 1 can include subject matter (such as Radio frequency (RF) communication circuitry) comprising a first RF transceiver and conflict detection circuitry. The RF transceiver device includes a first communication path configured to down-convert received RF signals using a first local oscillator (LO) receive frequency and a second communication path configured to down-convert received RF signals using a second LO receive frequency and to operate simultaneously with the first communication path. The conflict detection circuitry is configured to determine path crosstalk using the first and second LO receive frequencies and using a first LO transmit frequency used by the first RF transceiver or a second RF transceiver to up-convert electrical signals for RF transmission, and initiate a change of the first LO receive frequency by a first frequency shift value and a change of the second LO receive frequency by a second frequency shift value in response to the path crosstalk.

In Example 2, the subject matter of Example 1 can optionally include conflict detection circuitry configured to determine interference of an up-converted transmit signal, or a frequency harmonic of the up-converted transmit signal, with a $k^{th}$ side-tone of the first LO receive frequency or an $m^{th}$ side-tone of second LO receive frequency, wherein k and m are positive integers, and initiate a shift of the first LO receive frequency and the second LO receive frequency to generate a first frequency separation margin between the first transmit LO frequency and the frequency of the $k^{th}$ side tone of the first LO receive frequency and a second different frequency separation margin between the first transmit LO frequency and the $m^{th}$ side tone of the second LO receive frequency.

In Example 3, the subject matter of one or both of Examples 1 and 2 can optionally include conflict detection circuitry configured to determine path crosstalk by determining one or both of whether an RF signal, transmit by the first RF transceiver or the second RF transceiver, is down-mixed by a side tone of the first LO receive frequency to interfere in the first communication path and whether the RF signal transmitted is down-mixed by a side tone of the second LO receive frequency to interfere in the second communication path.

In Example 4, the subject matter of one or any combination of Examples 1-3 can optionally include the first RF transceiver being included in first user equipment (UE) and the conflict detection circuitry being included in an RF control unit device having processing circuitry, wherein the conflict detection circuitry is included in the processing circuitry and the processing circuitry is configured to initiate a determination of path crosstalk when the first LO receive frequency, the second LO receive frequency, and the first LO transmit frequency are selected in the RF control unit device.

In Example 5, the subject matter of one or any combination of Examples 1-4 can optionally include a second RF transceiver. The second RF transceiver optionally includes a third communication path configured to up-convert the electrical signals for RF transmission using the LO transmit frequency, wherein the first RF transceiver is included in a first RF communication device and the second RF transceiver is included in a second RF communication device, and wherein the conflict detection circuitry is included in processing circuitry of one or both of the first RF communication device and the second RF communication device.

In Example 6, the subject matter of one or any combination of Examples 1-5 can optionally include a first communication path of the first RF transceiver configured to up-convert electrical signals for RF transmission using the first LO transmit frequency and down-convert the received RF signals using the first LO receive frequency, and wherein the first and second communication paths are included in an RF communication device and the conflict detection circuitry is included in processing circuitry of the RF communication device.

In Example 7, the subject matter of Example 6 optionally includes processing circuitry configured to initiate a determination of path crosstalk when interference is detected on one or both of the first communication path and the second communication path.

In Example 8, the subject matter of one or both of Example 6 and 7 optionally include processing circuitry configured to initiate a determination of path crosstalk when the first LO receive frequency, the second LO receive frequency, and the first LO transmit frequency are specified in the RF communication device.

In Example 9, the subject matter of one or any combination of Examples 6-8 optionally include an RF transmit channel of the first communication path having a transmit center frequency determined by the LO transmit frequency and a frequency bandwidth around the transmit center frequency, a first RF receive channel of the first communication path having a first receive center frequency determined by the first receive LO frequency and a frequency bandwidth around the first receive center frequency, a second RF receive channel of the second communication path includes a second receive center frequency determined by the second LO receive frequency and a frequency bandwidth around the second receive center frequency, and conflict detection circuitry is configured to calculate a shift in frequency of one or both of the first LO receive frequency and the second LO receive frequency using the first LO receive frequency, the second LO receive frequency, the LO transmit frequency, and bandwidths of the RF transmit channel, the first RF receive channel, and the second RF receive channel.

In Example 10, the subject matter of one or any combination of Examples 6-9 optionally includes tuneable frequency synthesizer circuitry in conductive communication with the conflict detection circuitry, wherein the tuneable frequency synthesizer circuitry is configured to generate the first LO transmit frequency, the first LO receive frequency, and the second LO receive frequency.

In Example 11, the subject matter of one or any combination of Examples 6-10 optionally includes a second communication path is configured to both down-convert received RF signals using the second LO receive frequency and up-convert electrical signals for RF transmission using a second LO transmit frequency, and wherein the control detection circuit is configured to determine path crosstalk using the first and second LO receive frequencies and using the second LO transmit frequency.

In Example 12, the subject matter of one or any combination of Examples 1-11 optionally includes the RF communication circuitry included in user equipment (UE) for an end-to-end communication network.

In Example 13, the subject matter of one or any combination of Examples 1-12 optionally includes a plurality of antennas conductively coupled to the first RF transceiver.

In Example 14, the subject matter of one or any combination of Examples 1-13 optionally includes the first communication path and the second communication path included in a same integrated circuit (IC) die.

In Example 15, the subject matter of one or any combination of Examples 1-14 optionally includes a first RF transceiver is configured to communicate data using at least one of a long term evolution (LTE) communication protocol, a universal mobile telecommunications system (UMTS) protocol, or a global system for mobile communications (GSM) protocol.

In Example 16, the subject matter of one or any combination of Examples 1-15 optionally includes processing circuitry and a memory in conductive communication with the processing circuitry, wherein the processing circuitry includes a processor, and wherein the memory, processor, first communication path, and second communication path are including in a same IC die.

In Example 17, the subject matter of one or any combination of Examples 1-16 optionally includes second communication path is configured to operate in a same frequency band simultaneously with the first communication path.

Example 18 can include subject matter (such as a method, a means for performing acts, or a machine-readable medium including instructions that, when performed by the machine, cause the machine to perform acts), or can optionally be combined with the subject matter of one or any combination of Examples 1-17 to include such subject matter, comprising down-converting, using a first communication path of a first RF transceiver, received RF signals using a first LO receive frequency, down-converting, using a second communication path of the first RF transceiver device, received RF signals using a second LO receive frequency wherein the second communication path operates simultaneously with the first communication channel, determining, by conflict detection circuitry, path crosstalk according to the first and second LO receive frequencies, and a first LO transmit frequency used by the first RF transceiver or a second RF transceiver to up-convert electrical signals for RF transmission, and shifting the first LO receive frequency by a first frequency value and shifting the second LO receive frequency by a second frequency value to reduce or remove the path crosstalk.

In Example 19, the subject matter of Example 18 can optionally include determining an overlap of the frequency of an up-converted transmit signal, or a harmonic of the up-converted transmit signal, with a $k^{th}$ side-tone of the first LO receive frequency or an $m^{th}$ side-tone of the second LO receive frequency, wherein k and m are positive integers, and separating the first transmit LO frequency and the frequency of the $k^{th}$ side tone of the first LO receive frequency by a first frequency separation margin, and separating the first transmit LO frequency and the $m^{th}$ side tone of the second LO receive frequency by a second different frequency separation margin.

In Example 20, the subject matter of one or both of Examples 18 and 19 optionally includes up-converting, using the first communication path of the first RF transceiver, RF signals for transmission using the first LO transmit frequency wherein an RF transmit channel of the first communication path includes a transmit center frequency determined by the LO transmit frequency and a frequency bandwidth around the transmit center frequency and wherein down-converting received RF signals using the first LO receive frequency and down-converting received RF signals using the second LO receive frequency generate unwanted side tone receive channels of the first communication path or the second communication path, and determining an overlap of the RF transmit channel with an unwanted side tone receive channel of the first or second communication path.

In Example 21, the subject matter of one or any combination of Examples 18-20 optionally includes up-converting, using a communication path of the second RF transceiver, RF signals for transmission using the first LO transmit frequency, wherein determining crosstalk includes determining an overlap of an RF transmit channel of the second RF transceiver with an unwanted side tone receive channel of the first or second communication path of the first RF transceiver.

In Example 22, the subject matter of one or any combination of Examples 18-21 optionally includes generating the first LO receive frequency and the second LO receive circuit using tuneable frequency synthesizer circuitry conductively coupled to the first RF transceiver, and wherein shifting the first LO receive frequency includes tuning the frequency synthesizer circuitry to change the first LO receive frequency by a first frequency shift value, and wherein shifting the second LO receive frequency includes tuning the frequency synthesizer circuitry to change the second LO receive frequency by a second frequency shift value.

In Example 23, the subject matter of one or any combination of Examples 18-22 optionally includes operating the second communication path in a same frequency band and in a same integrated circuit die simultaneously with the first communication path.

Example 24 can include subject matter, or can optionally be combined with the subject matter of one or any combination of Examples 1-23 to include such subject matter, such as a computer readable storage medium including instructions that when performed by hardware processing circuitry of an RF communication device causes the RF communication device to: down-convert RF signals received via a first communication path of a first RF transceiver using a first LO receive frequency, down-convert RF signals received via a second communication path of the first RF transceiver using a second LO receive frequency, wherein the second communication path operates simultaneously with the first communication channel, receive an indication of path crosstalk according to the first and second LO receive frequencies and a first LO transmit frequency used by the first RF transceiver or a second RF transceiver to up-convert electrical signals for RF transmission, and shift the first LO receive frequency by a first frequency value and shift the second LO receive frequency by a second frequency value to reduce or remove the path crosstalk.

In Example 25, the subject matter of Example 24 optionally includes instructions that when executed by the hardware processing circuitry cause the RF communication device to: up-convert RF signals for transmission via the first communication path using the first LO transmit frequency, determine the path crosstalk as an overlap of the frequency of the up-converted transmit signal, or a harmonic of the up-converted transmit signal, with a $k^{th}$ side-tone of one of the first LO receive frequency or an $m^{th}$ side-tone of the second LO receive frequency, wherein k and m are positive integers, and shift the first LO receive frequency and the second LO receive frequency to separating the first transmit LO frequency and the frequency of the $k^{th}$ side tone of the first LO receive frequency by a first frequency separation margin, and separating the first transmit LO frequency and the $m^{th}$ side tone of the second LO receive frequency by a second different frequency separation margin.

In Example 26, the subject matter of one or both of Examples 24 and 25 optionally include instructions that when executed by the hardware processing circuitry cause the RF communication device to: generate unwanted side tone receive channels of the first communication path, generate unwanted side tone receive channels of the second communication path, and determine the path cross talk as an overlap of a RF transmit channel of the first communication path with an unwanted side tone receive channel of the first or second communication path, wherein the RF transmit channel includes a transmit center frequency determined by the first LO transmit frequency and a frequency bandwidth around the transmit center frequency.

In Example 27, the subject matter of one or any combination of Examples 24-26 optionally include including instructions that, when executed by the hardware processing circuitry, generate the first LO receive frequency and the second LO receive circuit using tuneable frequency synthesizer circuitry, tune the frequency synthesizer circuit to change the first LO receive frequency by a first frequency shift value, and tune the frequency synthesizer circuitry to change the second LO receive frequency by a second frequency shift value.

Example 28 can include subject matter (such as a radio frequency (RF) communication device) or can optionally be combined with the subject matter of one or any combination of Examples 1-27 to include such subject matter, comprising physical layer circuitry and processing circuitry. The physical layer circuitry includes a first communication path configured to up-convert electrical signals for radio frequency (RF) transmission using a first local oscillator (LO) transmit frequency and down-convert received RF signals using a LO receive frequency, and a second communication path configured to up-convert RF signals for transmission using a second LO transmit frequency and to operate simultaneously with the first communication path. The processing circuitry includes a conflict detection circuit configured to: determine path crosstalk using the first LO transmit frequency, the LO receive frequency, and the second LO transmit frequency; and to initiate a change of the LO receive frequency by a first frequency shift value and a change of one or both of the first LO transmit frequency and the second LO transmit frequency by a second frequency shift value in response to the path crosstalk.

In Example 29, the subject matter of Example 28 optionally includes conflict detection circuit configured to determine interference of a transmit signal up-converted using the first LO transmit frequency or the second LO transmit frequency with a $k^{th}$ side-tone of the LO receive frequency, wherein k is a positive integer, and initiate a shift of the LO receive frequency and a shift in the first LO transmit frequency to generate a first frequency separation margin between the first transmit LO frequency and the frequency of the $k^{th}$ side tone of the LO receive frequency and a second different frequency separation margin between the second transmit LO frequency and the $k^{th}$ side tone of the LO receive frequency.

In Example 30, the subject matter of one or both of Examples 28 and 29 optionally includes conflict detection circuit configured to determine path crosstalk by determining one or both of whether an RF transmit signal up-converted using the first LO transmit signal is down-mixed by a side tone of the LO receive frequency to interfere in the first communication path and whether an RF transmit signal up-converted using the second LO transmit signal is down-mixed by the side tone of the LO receive frequency to interfere in the first communication path.

In Example 31, the subject matter of one or any combination of Examples 28-30 optionally includes processing circuitry configured to initiate a determination of path crosstalk when the first LO transmit frequency, the second LO transmit frequency, and the LO receive frequency are specified in the RF transceiver device.

In Example 32, the subject matter of one or any combination of Examples 28-31 optionally includes processing circuitry configured to initiate a determination of path crosstalk when interference is detected on one or both of the first communication path and the second communication path.

Example 33 can include, or can optionally be combined with any portion or combination of any portions of any one or more of Examples 1-32 to include, subject matter that can include means for performing any one or more of the functions of Examples 1-32, or a machine-readable medium including instructions that, when performed by a machine, cause the machine to perform any one or more of the functions of Examples 1-32.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. Radio frequency (RF) communication circuitry comprising:
   a first RF transceiver including:
   a first communication path configured to down-convert received RF signals using a first local oscillator (LO) receive frequency; and a second communication path configured to down-convert received RF signals using a second LO receive frequency and to receive the RF signals simultaneously with the first communication path on a separate frequency channel; and conflict detection circuitry configured to:

determine path crosstalk using the first and second LO receive frequencies and using a first LO transmit frequency used by the first RF transceiver or a second RF transceiver to up-convert electrical signals for RF transmission;

calculate frequency separation of the first LO receive frequency, the second LO receive frequency and the LO transmit frequency, and calculate a first frequency shift value for the first LO receive frequency and a second frequency shift value for the second LO receive frequency using the frequency separation; and initiate a change of the first LO receive frequency by the first frequency shift value and a change of the second LO receive frequency by the second frequency shift value according to the path crosstalk.

2. The RF communication circuitry of claim 1, wherein the conflict detection circuitry is configured to:

determine interference of an up-converted transmit signal, or a frequency harmonic of the up-converted transmit signal, with a $k^{th}$ side-tone of the first LO receive frequency or an $m^{th}$ side-tone of second LO receive frequency, wherein k and m are positive integers; and initiate a shift of the first LO receive frequency and the second LO receive frequency to generate a first frequency separation margin between the first transmit LO frequency and the frequency of the $k^{th}$ side tone of the first LO receive frequency and a second different frequency separation margin between the first transit LO frequency and the $m^{th}$ side tone of the second LO receive frequency.

3. The RF communication circuitry of claim 1, wherein the conflict detection circuitry is configured to determine path crosstalk by determining one or both of whether an RF signal, transmit by the first RF transceiver or the second RF transceiver, is down-mixed by a side tone of the first LO receive frequency to interfere in the first communication path and whether the RF signal transmitted is down-mixed by a side tone of the second LO receive frequency to interfere in the second communication path.

4. The RF communication circuitry of claim 1, wherein the first RF transceiver is included in first user equipment (UE) and the conflict detection circuitry is included in an RF control unit device having processing circuitry, wherein the conflict detection circuitry is included in the processing circuitry and the processing circuitry is configured to initiate a determination of path crosstalk when the first LO receive frequency, the second LO receive frequency, and the first LO transmit frequency are selected in the RF control unit device.

5. The RF communication circuitry of claim 1, including the second RF transceiver, wherein the second RF transceiver includes a third communication path configured to up-convert the electrical signals for RF transmission using the LO transmit frequency, wherein the first RF transceiver is included in a first RF communication device and the second RF transceiver is included in a second RF communication device, and wherein the conflict detection circuitry is included in processing circuitry of one or both of the first RF communication device and the second RF communication device.

6. The RF communication circuitry of claim 1, wherein first communication path of the first RF transceiver is configured to up-convert electrical signals RF transmission using the first LO transmit frequency and down-convert the received RF signals using the first LO receive frequency, and wherein the first and second communication paths are included in an RF communication device and the conflict detection circuitry is included in processing circuitry of the RF communication device.

7. The RF communication circuitry of claim 6, wherein the processing circuitry is configured to initiate a determination of path crosstalk when interference is detected on one or both of the first communication path and the second communication path.

8. The RF communication circuitry of claim 6, wherein the processing circuitry of the RF communication device is configured to initiate a determination of path crosstalk when the first LO receive frequency, the second LO receive frequency, and the first LO transmit frequency are specified in the RF communication device.

9. The RF communication circuitry of claim 6, wherein an RF transmit channel of the first communication path includes a transmit center frequency determined by the LO transmit frequency and a frequency bandwidth around the transmit center frequency, wherein a first RF receive channel of the first communication path includes a first receive center frequency determined by the first receive LO frequency and a frequency bandwidth around the first receive center frequency, wherein a second RF receive channel of the second communication path includes a second receive center frequency determined by the second LO receive frequency and a frequency bandwidth around the second receive center frequency, wherein the conflict detection circuitry is configured to calculate the first frequency shift value and the second frequency shift value using the first LO receive frequency, the second LO receive frequency, the LO transmit frequency, and bandwidths of the RF transmit channel, the first RF receive channel, and the second RF receive channel.

10. The RF communication circuitry of claim 6, including tuneable frequency synthesizer circuitry in conductive communication with the conflict detection circuitry, wherein the tuneable frequency synthesizer circuitry is configured to generate the first LO transmit frequency, the first LO receive frequency, and the second LO receive frequency.

11. The RF communication circuitry of claim 6, wherein the second communication path is configured to both down-convert received RF signals using the second LO receive frequency and up-convert electrical signals for RF transmission using a second LO transmit frequency, and wherein the control detection circuit is configured to determine path crosstalk using the first and second LO receive frequencies and using the second LO transmit frequency.

12. The RF communication circuitry of claim 1, wherein the RF communication circuitry is included in user equipment (UE) for an end-to-end communication network.

13. The RF communication circuitry of claim 1, including a plurality of antennas conductively coupled to the first RF transceiver.

14. The RF communication circuitry of claim 1, wherein the first communication path and the second communication path are included in a same integrated circuit (IC) die.

15. The RF communication circuitry of claim 1, wherein the first RF transceiver is configured to communicate data using at least one of a long term evolution (LTE) communication protocol, a universal mobile telecommunications system (UMTS) protocol, or a global system for mobile communications (GSM) protocol.

16. The RF communication circuitry of claim 1, including processing circuitry and a memory in conductive communication with the processing circuitry, wherein the processing circuitry includes a processor, and wherein the memory, processor, first communication path, and second communication path are including in a same IC die.

17. A method of operating RF communication circuitry in an end-to-end communication network, the method comprising:
down-converting, using a first communication path of a first RF transceiver, received RF signals using a first LO receive frequency;
down-converting, using a second communication path of the first RF transceiver device, received RF signals using a second LO receive frequency, wherein the second communication path receives the RF signals simultaneously with the first communication channel on a separate frequency channel;
determining, by conflict detection circuitry, path crosstalk according to the first and second LO receive frequencies, and a first LO transmit frequency used by the first RF transceiver or a second RF transceiver to up-convert electrical signals for RF transmission;
calculating frequency separation of the first LO receive frequency, the second LO receive frequency and the LO transmit frequency, and calculating a first frequency shift value for the first LO receive frequency and a second frequency shift value for the second LO receive frequency using the frequency separation; and
shifting the first LO receive frequency by the first frequency value and shifting the second LO receive frequency by the second frequency value to reduce or remove the path crosstalk.

18. The method of claim 17, wherein determining crosstalk includes determining an overlap of the frequency of an up-converted transmit signal, or a harmonic of the up-converted transmit signal, with a $k^{th}$ side-tone of the first LO receive frequency or an $m^{th}$ side-tone of the second LO receive frequency, wherein k and m are positive integers, and wherein shifting the first LO receive frequency and the second LO receive frequency includes separating the first transmit LO frequency and the frequency of the $k^{th}$ side tone of the first LO receive frequency by a first frequency separation margin, and separating the first transmit LO frequency and the $m^{th}$ side tone of the second LO receive frequency by a second different frequency separation margin.

19. The method if claim 17, including up-converting, using the first communication path of the first RF transceiver, RF signals for transmission using the first LO transmit frequency, wherein an RF transmit channel of the first communication path includes a transmit center frequency determined by the LO transmit frequency and a frequency bandwidth around the transmit center frequency, wherein down-converting received RF signals using the first LO receive frequency and down-converting received RF signals using the second LO receive frequency generate unwanted side tone receive channels of the first communication path or the second communication path, and wherein determining crosstalk includes determining an overlap of the RF transmit channel with an unwanted side tone receive channel of the first or second communication path.

20. A non-transitory computer readable storage medium including instructions that when executed by hardware processing circuitry of an RF communication device causes the RF communication device to:
down-convert RF signals received via a first communication path of a first RF transceiver using a first LO receive frequency;
down-convert RE signals received via a second communication path of the first RF transceiver using a second LO receive frequency, wherein the second communication path receives the RF signals simultaneously with the first communication path on a separate frequency channel;
receive an indication of path crosstalk according to the first and second LO receive frequencies and a first LO transmit frequency used by the first RF transceiver or a second RF transceiver to up-convert electrical signals for RF transmission;
calculate a first frequency shift value and a second frequency shift value using the first LO receive frequency, the second LO receive frequency, the LO transmit frequency, and bandwidths of the RF transmit channel, the first RF receive channel, and the second RF receive channel; and
shift the first LO receive frequency by the first frequency shift value and shift the second LO receive frequency by the second frequency shift value to reduce or remove the path crosstalk.

21. The non-transitory computer readable storage medium of claim 20, including instructions that when executed by the hardware processing circuitry cause the RF communication device to:
up-convert RF signals for transmission via the first communication path using the first LO transmit frequency;
determine the path crosstalk as an overlap of the frequency of the up-converted transmit signal, or a harmonic of the up-converted transmit signal, with a $k^{th}$ side-tone of one of the first LO receive frequency or an $m^{th}$ side-tone of the second LO receive frequency, wherein k and m are positive integers; and
shift the first LO receive frequency and the second LO receive frequency by separating the first transmit LO frequency and the frequency of the $k^{th}$ side tone of the first LO receive frequency by a first frequency separation margin, and separating the first transmit LO frequency and the $m^{th}$ side tone of the second LO receive frequency by a second different frequency separation margin.

22. The non-transitory computer readable storage medium of claim 20, including instructions that when executed by the hardware processing circuitry cause the RF communication device to:
generate unwanted side tone receive channels of the first communication path;
generate unwanted side tone receive channels of the second communication path; and
determine the path cross talk as an overlap of a RF transmit channel of the first communication path with an unwanted side tone receive channel of the first or second communication path, wherein the RF transmit channel includes a transmit center frequency determined by the first LO transmit frequency and a frequency bandwidth around the transmit center frequency.

23. A radio frequency (RF) communication device comprising:
physical layer circuitry including:
a first communication path configured to up-convert electrical signals for radio frequency (RF) transmission using a first local oscillator (LO) transmit frequency and down-convert received RF signals using a LO receive frequency; and a second communication path configured to up-convert RF signals for transmission using a second LO transmit frequency and to receive the RF signals simultaneously with the first communication path on a separate frequency channel; and processing circuitry including a conflict detection circuit configured to:

determine path crosstalk using the first LO transmit frequency, the LO receive frequency, and the second LO transmit frequency;

calculate frequency separation of the LO receive frequency, the first LO transmit frequency and the second LO transmit frequency and calculate a first frequency shift value and a second frequency shift value using the frequency separation; and initiate a change of the LO receive frequency by the first frequency shift value and a change of one or both of the first LO transmit frequency and the second LO transmit frequency by the second frequency shift value in response to the path crosstalk.

24. The RF communication device of claim 23, wherein conflict detection circuit is configured to:

determine interference of a transmit signal up-converted using the first LO transmit frequency or the second LO transmit frequency with a $k^{th}$ side-tone of the LO receive frequency, wherein k is a positive integer; and initiate a shift of the LO receive frequency and a shift in the first LO transmit frequency to generate a first frequency separation margin between the first transmit LO frequency and the frequency of the $k^{th}$ side tone of the LO receive frequency and a second different frequency separation margin between the second transmit LO frequency and the $k^{th}$ side tone of the LO receive frequency.

25. The RF communication device of claim 23, wherein the conflict detection circuit is configured to determine path crosstalk by determining one or both of whether an RF transmit signal up-converted using the first LO transmit signal is down-mixed by a side tone of the LO receive frequency to interfere in the first communication path and whether an RF transmit signal up-converted using the second LO transmit signal is down-mixed by the side tone of the LO receive frequency to interfere in the first communication path.

* * * * *

UNITED STATES PATENT AND TRADEMARK OFFICE
CERTIFICATE OF CORRECTION

PATENT NO. : 9,912,425 B2
APPLICATION NO. : 14/570876
DATED : March 6, 2018
INVENTOR(S) : Laaser et al.

Page 1 of 1

It is certified that error appears in the above-identified patent and that said Letters Patent is hereby corrected as shown below:

On the Title Page

On page 2, in Column 2, item (56) under "Other Publications", Line 23, delete "PI 2005153," and insert --PI 20051523,-- therefor On page 2, in Column 2, item (56) under "Other Publications", Line 25, delete "PI20051531," and insert --PI 20051531,-- therefor On page 2, in Column 2, item (56) under "Other Publications", Line 38, delete "Aug. 8, 2017"," and insert --Aug. 9, 2017",-- therefor In the Claims In Column 15, Line 34, in Claim 2, delete "transit" and insert --transmit-- therefor In Column 15, Line 66, in Claim 6, after "wherein", insert --the--

In Column 16, Line 1, in Claim 6, after "signals", insert --for--

In Column 17, Line 49, in Claim 19, delete "if" and insert --of-- therefor

In Column 18, Line 4, in Claim 20, delete "RE" and insert --RF-- therefor

Signed and Sealed this
Twenty-fifth Day of June, 2019

Andrei Iancu
*Director of the United States Patent and Trademark Office*